(12) United States Patent
Kang et al.

(10) Patent No.: US 8,798,100 B2
(45) Date of Patent: Aug. 5, 2014

(54) APPARATUS AND METHOD FOR SUPPORTING ASYMMETRIC CARRIER AGGREGATION IN WIRELESS COMMUNICATION SYSTEM

(75) Inventors: Hyun-Jeong Kang, Seoul (KR); Chi-Woo Lim, Suwon-si (KR); Jae-Weon Cho, Seongnam-si (KR); Tae-Young Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 291 days.

(21) Appl. No.: 13/032,124

(22) Filed: Feb. 22, 2011

(65) Prior Publication Data
US 2011/0205905 A1 Aug. 25, 2011

(30) Foreign Application Priority Data
Feb. 23, 2010 (KR) ........................ 10-2010-0016042

(51) Int. Cl.
*H04J 1/00* (2006.01)
*H04B 7/00* (2006.01)

(52) U.S. Cl.
USPC ........ 370/482; 370/310.2; 370/332; 370/344; 370/442

(58) Field of Classification Search
USPC .............. 370/294, 295, 310.2, 314, 321, 322, 370/328, 330, 332, 341, 344, 345, 348, 436, 370/439, 442, 443, 478, 480, 482, 498
See application file for complete search history.

(56) References Cited

U.S. PATENT DOCUMENTS

| | | | |
|---|---|---|---|
| 8,441,998 B2* | 5/2013 | Kim et al. | 370/329 |
| 2008/0119213 A1 | 5/2008 | Ihm et al. | |
| 2008/0242340 A1* | 10/2008 | Kang et al. | 455/525 |
| 2008/0247340 A1* | 10/2008 | Choi et al. | 370/281 |
| 2011/0009123 A1* | 1/2011 | Queseth et al. | 455/450 |
| 2011/0141926 A1* | 6/2011 | Damnjanovic et al. | 370/252 |
| 2011/0205905 A1* | 8/2011 | Kang et al. | 370/241 |

FOREIGN PATENT DOCUMENTS

| | | |
|---|---|---|
| JP | 2008-539667 A | 11/2008 |
| JP | 2009-010632 A | 1/2009 |
| JP | 2013-503567 A | 1/2013 |
| KR | 10-2008-0044590 A | 5/2008 |
| WO | 2008-075884 A2 | 6/2008 |

OTHER PUBLICATIONS

"Asymmetric carrier frequency allocation to frequency division duplex links in multimedia cellular systems"; Hamabe, K.; May 2008; Vehicular Technology Conference.*

* cited by examiner

*Primary Examiner* — Benjamin H Elliott, IV
(74) *Attorney, Agent, or Firm* — Jefferson IP Law, LLP

(57) ABSTRACT

An apparatus and a method for transmitting feedback information of an asymmetric frequency band in a wireless communication system supporting multiple bands are provided. The feedback information transmission method includes, when at least two frequency bands used by a mobile station includes at least one asymmetric frequency band, confirming feedback channel information for the asymmetric frequency band based on system channel information of the asymmetric frequency band, and transmitting feedback information for the asymmetric frequency band over the confirmed feedback channel. The feedback channel information includes feedback channel information for the asymmetric frequency band allocated to a symmetric frequency band.

26 Claims, 11 Drawing Sheets

APPARATUS AND METHOD FOR SUPPORTING ASYMMETRIC CARRIER AGGREGATION IN WIRELESS COMMUNICATION SYSTEM

PRIORITY

The present application claims the benefit under 35 U.S.C. §119(a) to a Korean patent application filed in the Korean Intellectual Property Office on Feb. 23, 2010, and assigned Serial No. 10-2010-0016042, the entire disclosure of which is hereby incorporated by reference.

BACKGROUND OF THE INVENTION

1. Field of the Invention

The present invention relates to a wireless communication system using multiple bands. More particularly, the present invention relates to an apparatus and a method for supporting data transmission and reception of a mobile station using an asymmetric band in a wireless communication system which utilizes multiple bands.

2. Description of the Related Art

As wireless communication systems advance, service type expansion and high service quality are increasingly being demanded. As a result, a broadband wireless communication system has been introduced.

The broadband wireless communication system utilizes a limited frequency band. Accordingly, to provide broadband services, the broadband wireless communication system utilizes an available resource in the limited frequency band. For example, in a wireless communication system based on the Institute of Electrical and Electronics Engineers (IEEE) 802.16 standard, a Base Station (BS) manages at least one Frequency Assignment (FA). The BS provides the wireless communication service to a Mobile Station (MS) over its managed FA.

FIGS. 1A and 1B depict a configuration according to a number of frequency bands supported in a wireless communication system according to the related art.

FIG. 1A depicts an MS receiving a wireless communication service using one FA at a time, and FIG. 1B depicts an MS receiving the wireless communication service using two FAs at a time.

Referring to FIG. 1A, the MS 100 can migrate from an FA1 zone 120 to an FA2 zone 140. Herein, the FA1 zone 120 indicates a service coverage area using the FA1 and the FA2 zone 140 indicates a service coverage area using the FA2. For example, when the MS 100 travels in the FA1 zone 120, the MS 100 operates only one FA (e.g., FA1). When the FA1 and the FA2 are managed by different BSs, the MS 100 may use the wireless communication service using the FA2 after handover between the FAs.

Referring to FIG. 1B, it is assumed that the MS 150 can use at least two FAs. The MS 150 can receive the wireless communication service using both of the FA1 zone 160 and the FA2 zone 180. When the MS and the BS transmit and receive signals over the multiple FAs as above, the MS and the BS can transmit and receive high-capacity data at a high data rate.

When the MS uses a plurality of the FAs at the same time, the FAs used by the MS can be configured asymmetrically as shown in FIGS. 2A, 2B and 2C.

FIGS. 2A, 2B and 2C depict asymmetric frequency band configuration in a wireless communication system supporting multiple bands according to the related art.

Referring to FIG. 2A, the FA1 201 is used to transmit UpLink (UL) data, the FA2 203 is used to transmit DownLink (DL) data, and the FA3 205 is used to transmit UL data and DL data. That is, the FA1 201 and the FA2 203 indicate the FAs supporting a Frequency Division Duplex (FDD) structure, and the FA3 205 indicates the FA supporting a Time Division Duplex (TDD) structure. When the FA2 203 and the FA3 205 are allocated to the MS 150, the MS 150 has an asymmetric carrier aggregation and thus a DL signal is received using DL regions of the FA2 203 and the FA3 205 and a UL signal is transmitted using a UL region of the FA3 205.

Referring to FIG. 2B, the FA1 211, the FA2 213, and the FA3 215 are used to transmit UL data and DL data. Namely, the FA1 211, the FA2 213, and the FA3 215 indicate FAs supporting the TDD structure.

When the DL region of the FA1 211 and the FA2 213 are allocated to the MS 150, the MS 150 has the asymmetric carrier aggregation and thus a DL signal is received using the DL regions of the FA1 211 and the FA2 213 and a UL signal is received using the UL region of the FA2 213.

Referring to FIG. 2C, the FA1 221 is used to transmit DL data, the FA2 223 is used to transmit UL data and DL data, and the FA3 225 is used to transmit UL data. That is, the FA1 221 and the FA3 225 indicate FAs supporting the FDD structure, and the FA2 223 indicates an FA supporting the TDD structure.

When the FA1 221, the DL region of the FA2 223, and the FA3 225 are allocated to the MS 150, the MS has the asymmetric carrier aggregation and thus a DL signal is received using the FA1 221 and the DL region of the FA2 223 and a UL signal is received using the FA3 225.

The BS in the wireless communication system allocates a resource to the MS to provide the wireless communication service using channel feedback information received from the MS. However, in the asymmetric carrier aggregation, there can be no UL channel symmetrical to the DL channel. In this regard, what is needed is a separate method for transmitting the channel feedback information between the BS and the MS in the asymmetric carrier aggregation.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for communicating using multiple frequency bands between a mobile station and a base station in a wireless communication system.

Another aspect of the present invention is to provide an apparatus and a method for communicating between a mobile station and a base station using an asymmetric frequency band in a wireless communication system.

A further aspect of the present invention is to provide an apparatus and a method for transmitting channel feedback when data is transmitted and received using an asymmetric frequency band in a wireless communication system.

Yet another aspect of the present invention is to provide an apparatus and a method of a base station for allocating a channel feedback resource of an asymmetric S-FA when data is transmitted and received using an asymmetric frequency band in a wireless communication system.

Yet still another aspect of the present invention is to provide an apparatus and a method of a mobile station for transmitting channel feedback of an asymmetric S-FA when data is transmitted and received using an asymmetric frequency band in a wireless communication system.

In accordance with an aspect of the present invention, a method for transmitting feedback information of an asymmetric frequency band at a Mobile Station (MS) in a wireless communication system which supports multiple bands is provided. The method includes when at least two frequency bands used by the MS include at least one asymmetric frequency band, confirming feedback channel information for the asymmetric frequency band based on system channel information of the asymmetric frequency band, and transmitting feedback information for the asymmetric frequency band over the confirmed feedback channel. The feedback channel information includes feedback channel information for the asymmetric frequency band allocated to a symmetric frequency band.

In accordance with another aspect of the present invention, an apparatus for transmitting feedback information of an asymmetric frequency band at an MS in a wireless communication system which supports multiple bands is provided. The apparatus includes a receiver for, when at least two frequency bands used by the MS include at least one asymmetric frequency band, confirming feedback channel information for the asymmetric frequency band based on system channel information received over the asymmetric frequency band, and a transmitter for transmitting feedback information for the asymmetric frequency band over the confirmed feedback channel. The feedback channel information includes feedback channel information for the asymmetric frequency band allocated to a symmetric frequency band.

In accordance with yet another aspect of the present invention, a method for transmitting feedback channel information of an asymmetric frequency band at a Base Station (BS) in a wireless communication system which supports multiple bands is provided. The method includes when at least two frequency bands used by an MS include at least one asymmetric frequency band, transmitting feedback channel information for the asymmetric frequency band using system channel information of the asymmetric frequency band, and receiving feedback for the asymmetric frequency band over a feedback channel allocated to the asymmetric frequency band. The feedback channel information includes feedback channel information for the asymmetric frequency band allocated to a symmetric frequency band.

In accordance with still another aspect of the present invention, an apparatus for transmitting feedback channel information of an asymmetric frequency band at a BS in a wireless communication system which supports multiple bands is provided. The apparatus includes a transmitter for, when at least two frequency bands used by a Mobile Station (MS) include at least one asymmetric frequency band, transmitting feedback channel information for the asymmetric frequency band using system channel information of the asymmetric frequency band, and a receiver for receiving feedback for the asymmetric frequency band over a feedback channel allocated to the asymmetric frequency band. The feedback channel information includes feedback channel information for the asymmetric frequency band allocated to a symmetric frequency band.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE EXEMPLARY EMBODIMENTS

Figure 1A:
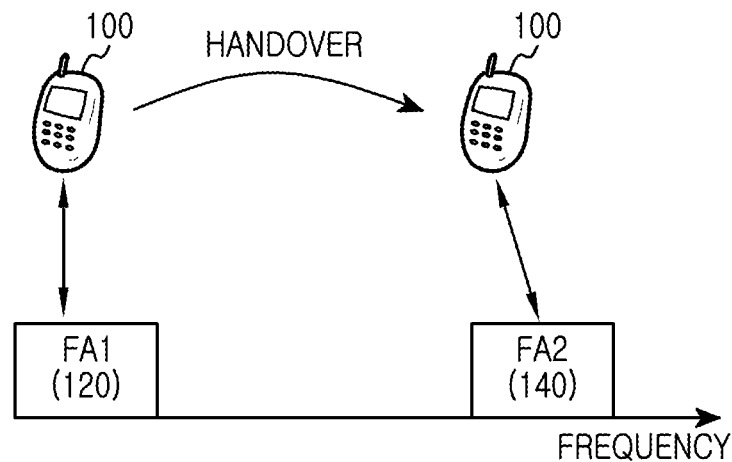
FIGS. 1A and 1B illustrate configuration according to the number of frequency bands supported in a wireless communication system according to the related art.
Figure 1B:
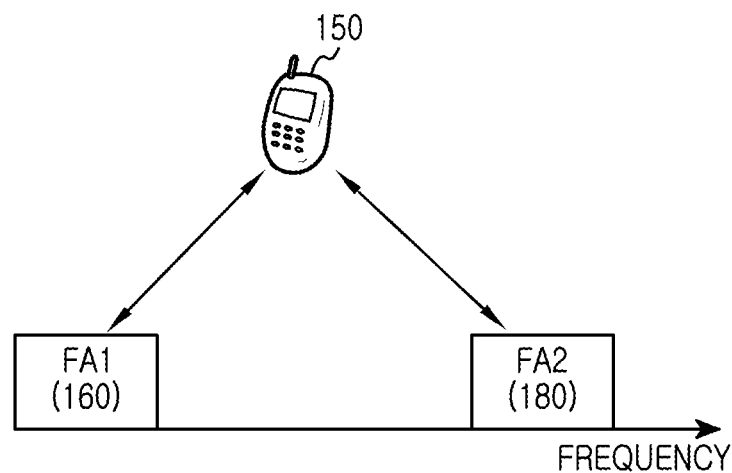

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 3 through 11, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Exemplary embodiments of the present invention provide a technique for transmitting feedback information when data is transmitted and received using an asymmetric frequency band in a wireless communication system which utilizes multiple bands.

Hereinafter, Orthogonal Frequency Division Multiplexing (OFDM)/Orthogonal Frequency Division Multiple Access (OFDMA) wireless communication system is exemplified. Note that the present invention is equally applicable to other wireless communication systems.

Hereafter, a mode of a Mobile Station (MS) and a Base Station (BS) for transmitting and receiving signals over a plurality of frequency bands is referred to as an overlay mode. A wireless communication system in the overlay mode is referred to as an overlay wireless communication system.

Figure 2A:
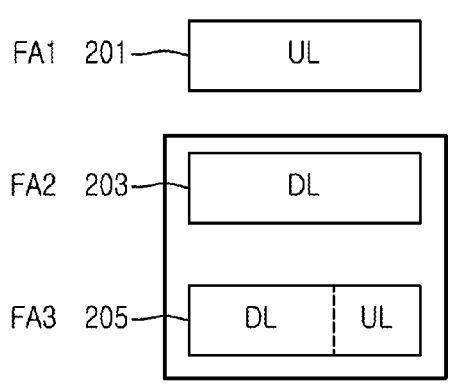
FIGS. 2A, 2B and 2C illustrate asymmetric frequency band configuration in a wireless communication system supporting multiple bands according to the related art.
Figure 2B:
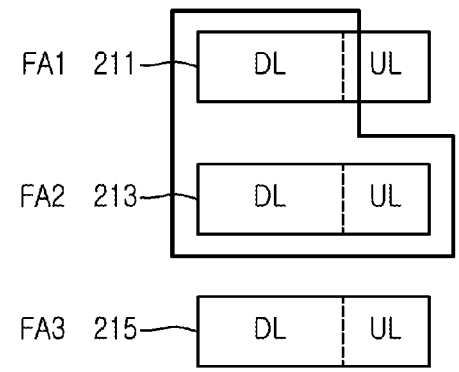
Figure 2C:
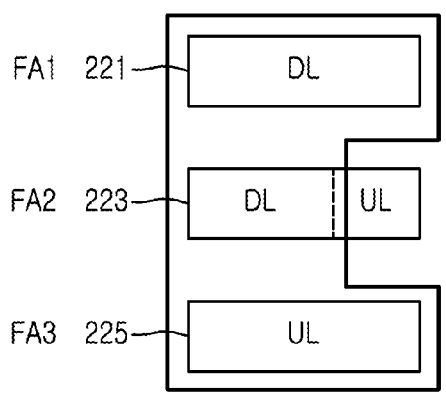

In the overlay mode using an asymmetric Secondary Frequency Assignment (S-FA) as shown in FIGS. 2A, 2B and 2C, the MS needs to provide feedback with respect to the asymmetric S-FA, in addition to a primary band. The BS should indicate resources of the Primary-FA (P-FA) used to transmit the feedback of the asymmetric S-FA. For example, using the asymmetric carrier aggregation of FIG. 2A, the BS should indicate resources of the P-FA used to transmit the feedback of the asymmetric FA2 203. The MS transmits the feedback of the asymmetric FA2 203 to the BS according to the instruction of the BS.

Now, a frame for the MS to transmit the feedback for the asymmetric S-FA is explained.

Figure 3:
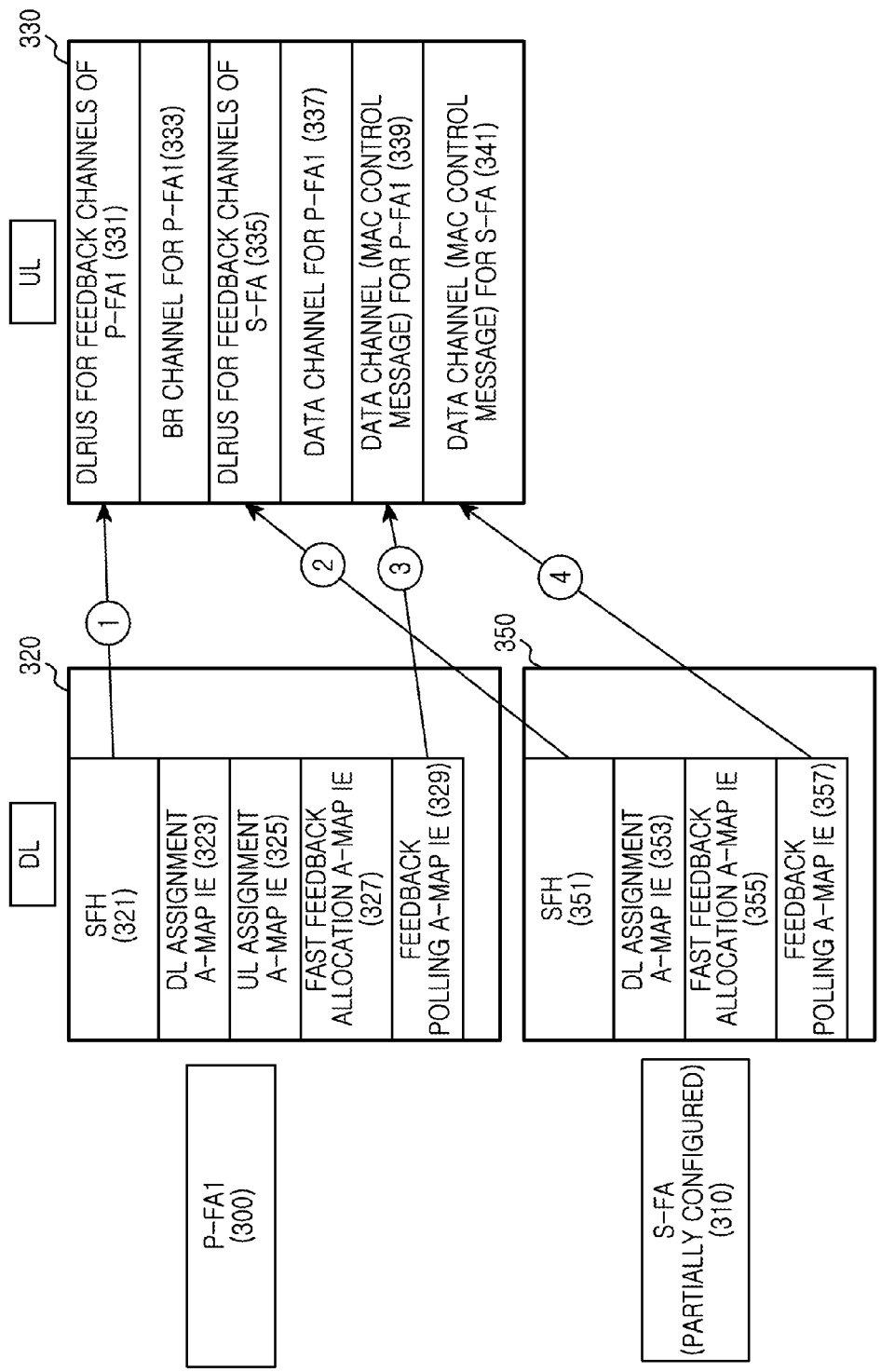
FIG. 3 illustrates a frame for transmitting feedback of an asymmetric frequency band in a wireless communication system according to an exemplary embodiment of the present invention.

FIG. 3 illustrates a frame for feedback transmittal of an asymmetric frequency band in a wireless communication system according to an exemplary embodiment of the present invention.

Referring to FIG. 3, a P-FA1 300 may include a DownLink (DL) region 320 and an UpLink (UL) region 330. A S-FA 310 includes a DL region 350. That is, the P-FA1 300 is configured in a Time Division Duplex (TDD) manner.

The DL region 320 of the P-FA1 300 includes a Super Frame Header (SFH) 321, DL resource allocation MAP information (DL assignment A-MAP Information Element (IE)) 323, UL resource allocation MAP information (UL assignment A-MAP IE) 325, fast feedback allocation MAP information (fast feedback allocation A-MAP IE) 327, and feedback poling MAP information (feedback polling A-MAP IE) 329. Herein, the fast feedback allocation MAP information 327 and the feedback polling MAP information 329, which are described to ease the understanding of exemplary embodiments of the present invention, may not be contained in the DL region 320 of the P-FA1 300.

The DL region 350 of the S-FA 310 may include an SFH 351, DL resource allocation MAP information 353, fast feedback allocation MAP information 355, and feedback polling MAP information 357. Herein, the fast feedback allocation MAP information 355 and the feedback polling MAP information 357, which are described to ease the understanding of exemplary embodiments of the present invention, may not be contained in the DL region 350 of the S-FA 310.

The UL region 330 of the P-FA1 300 includes feedback channel 331 for the DL of the P-FA1 300 (Distributed Logical Resource Units (DLRUs) for feedback channels of primary carrier), Band Request (BR) channel 333 of the P-FA1 300 (BR channel of primary carrier), feedback channel 335 for DL of the S-FA 310 (DLRUs for feedback channels of secondary carrier), data channel 337 of the P-FA1 300 (data channel for primary carrier), data channel 339 for transmitting fast feedback information of the P-FA1 300 (data channel (Media Access Control (MAC) control message) for primary carrier), and data channel 341 for transmitting fast feedback information of the S-FA 310 (data channel (MAC control message) for secondary carrier).

In such a frame, the DL feedback channel information 331 of the P-FA1 300 is transmitted through the SFH 321 of the P-FA1 300 as shown by the arrow 1, and the DL feedback channel information 335 of the S-FA 351 is transmitted through the SFH 351 of the S-FA 310 as shown by the arrow 2. The data channel information 339 for transmitting the fast feedback information of the P-FA1 300 is transmitted through the feedback polling MAP information 329 of the P-FA1 300 as shown by the arrow 3, and the data channel information 341 for transmitting the fast feedback information of the S-FA 310 is transmitted through the feedback polling MAP information 357 of the S-FA 310 as shown by the arrow 4. For example, the feedback channel information transmitted using the SFHs 321 and 351 includes the information of Table 1.

TABLE 1

| Field | Notes |
| --- | --- |
| Number of UL ACKnowledgement (ACK)/Non-ACKnowledgement (NACK) channels per Hybrid Automatic Repeat Request (HARQ) feedback region | The Number of HARQ feedback channels |
| Number of DLRUs for UL feedback channel per a UL Advanced Air Interface (AAI) subframe | The Number of UL feedback channels |

In Table 1, the SFHs 321 and 351 include entire feedback channel region information (number of DLRUs for UL feedback channel per a UL AAI subframe), and HARQ feedback transmission channel region information (number of UL ACK/NACK channels per HARQ feedback region) in the feedback channel region. For example, the SFH 321 of the P-FA1 300 includes the entire feedback channel region information of the P-FA1 300, and the HARQ feedback transmission channel region information of the feedback channel region. For example, the SFH 351 of the S-FA 310 includes the entire feedback channel region information of the S-FA 310, and the HARQ feedback transmission channel region information of the feedback channel region. Herein, the entire feedback channel region includes information combining the HARQ feedback transmission channel region and the fast feedback channel region. Accordingly, the MS can obtain the fast feedback channel region information using the entire feedback channel region information and the HARQ feedback transmission channel region information. The feedback channel region 335 for the S-FA 310 follows the BR channel 333. Hence, the SFH 351 of the S-FA 310 does not need to contain start information of the feedback channel region 335 for the S-FA 310.

When a plurality of MSs supports a Carrier Aggregation (CA) mode of the overlay mode, the P-FA of each MS can be defined differently. Thus, the P-FA of a particular MS can be the S-FA of another MS.

Alternatively, the P-FAs of the MSs supporting the overlay mode can be defined differently and their S-FAs can be set to the same FA. In this case, the S-FA can be an asymmetric band including only the DL, such as FA2 203 of FIG. 2A.

Alternatively, the P-FAs of the MSs supporting the overlay mode can be set to the same FA and their S-FAs can be defined differently. At this time, the S-FA can be an asymmetric band including only the DL, such as FA2 203 of FIG. 2A.

Figure 4:
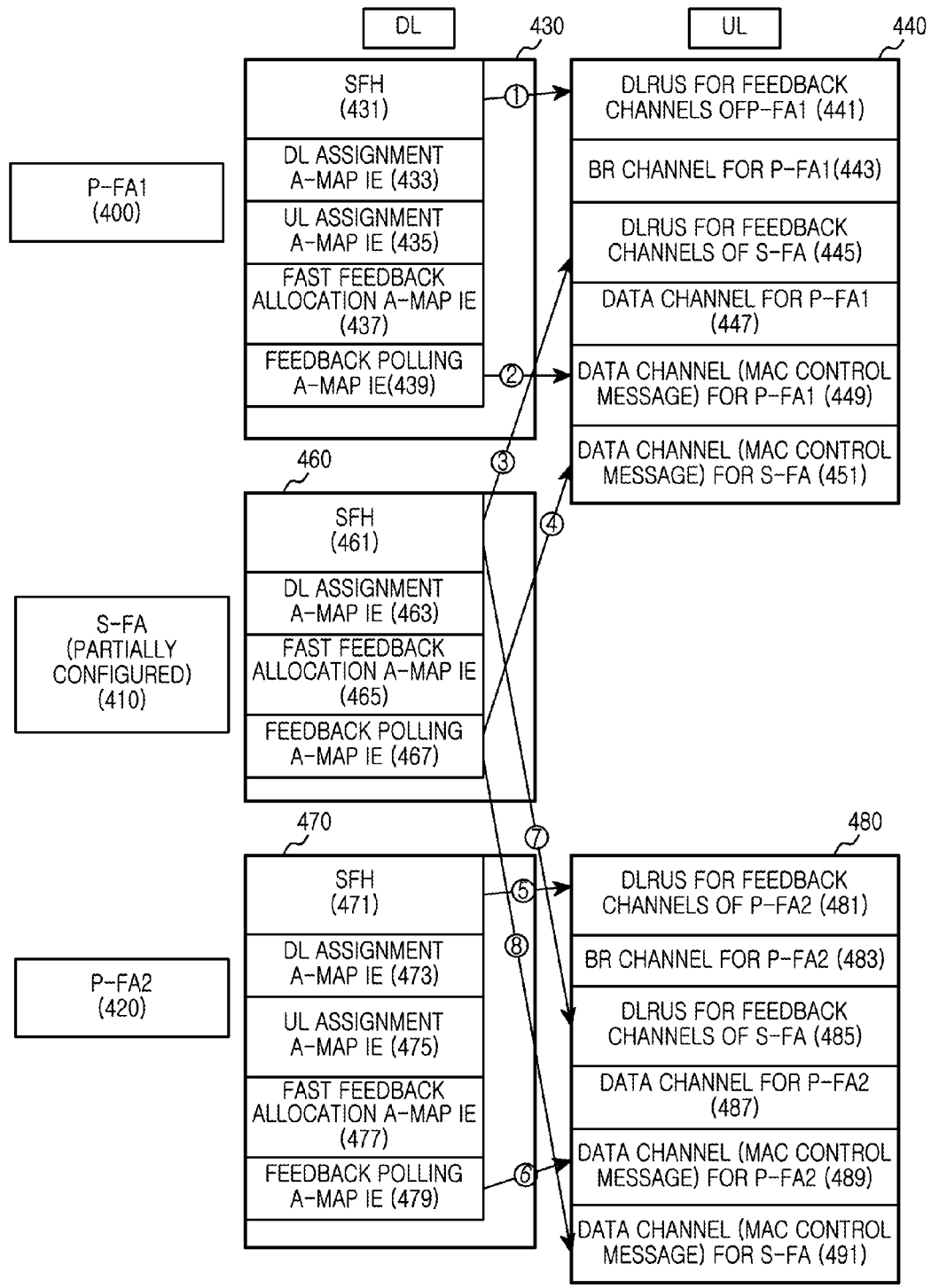
FIG. 4 illustrates a frame for transmitting feedback of an asymmetric frequency band in a wireless communication system according to an exemplary embodiment of the present invention.

When the MSs operating in the overlay mode share the S-FA and utilize the different P-FAs as stated above, a frame for transmitting the feedback for the asymmetric S-FA can be configured as shown in FIG. 4. For example, the frame of FIG. 4 can be used as well when the MSs share the P-FA and utilize different S-FAs.

FIG. 4 illustrates a frame for transmitting feedback of an asymmetric frequency band in a wireless communication system according to an exemplary embodiment of the present invention.

Referring to FIG. 4, a P-FA1 400 includes a DL region 430 and a UL region 440, an S-FA 410 includes a DL region 460, and a P-FA2 420 includes a DL region 470 and a UL region 480. That is, the P-FA1 400 and the P-FA2 420 are configured in the TDD manner.

The DL region 430 of the P-FA1 400 may include an SFH 431, DL resource allocation MAP information 433, UL resource allocation MAP information 435, fast feedback allocation MAP information 437, and feedback polling MAP information 439. Herein, the fast feedback allocation MAP information 437 and feedback polling MAP information 439, which are described to ease the understanding of exemplary embodiments of the present invention, may not be contained in the DL region 430 of the P-FA1 400.

The UL region 440 of the P-FA1 400 may include a feedback channel 441 for the DL of the P-FA1 400, a BR channel 443 of the P-FA1 400, a feedback channel 445 for the DL of the S-FA 410, a data channel 447 of the P-FA1 400, a data channel 449 for transmitting fast feedback information of the P-FA1 400, and a data channel 451 for transmitting fast feedback information of the S-FA 410. Herein, the feedback channel 445 and the data channel 449 for transmitting the fast feedback information of the P-FA1 400 utilize the P-FA1 400 and the S-FA 410, and includes information corresponding to the MS operating in the overlay mode.

The DL region 470 of the P-FA2 420 may include an SFH 471, DL resource allocation MAP information 473, UL resource allocation MAP information 475, fast feedback allocation MAP information 477, and feedback polling MAP information 479. Herein, the fast feedback allocation MAP information 477 and the feedback polling MAP information 479, which are described to ease the understanding of exemplary embodiments of the present invention, may not be contained in the DL region 470 of the P-FA2 420.

The UL region 480 of the P-FA2 420 includes a feedback channel 481 for the DL of the P-FA2 420, a BR channel 483 of the P-FA2 420, a feedback channel 485 for the DL of the S-FA 410, a data channel 487 of the P-FA2 420, a data channel 489 for transmitting fast feedback information of the P-FA2 420, and a data channel 491 for transmitting fast feedback information of the S-FA 410. Herein, the feedback channel 485 and the data channel 489 for transmitting the fast feedback information of the P-FA2 420 utilize the P-FA2 420 and the S-FA 410, and includes information corresponding to the MS operating in the overlay mode.

The DL region 460 of the S-FA 410 may include an SFH 461, DL resource allocation MAP information 463, fast feedback allocation MAP information 465, and feedback polling MAP information 467. Herein, the fast feedback allocation MAP information 465 and the feedback polling MAP information 467, which are described to ease the understanding of the present invention, may not be contained in the DL region 460 of the S-FA 410.

In this frame, the DL feedback channel information 441 of the P-FA1 400 is transmitted through the SFH 431 of the P-FA1 400 as shown by the arrow 1, and the DL feedback channel information 445 of the S-FA 410 is transmitted through the SFH 461 of the S-FA 410 as shown by the arrow 3. The data channel information 449 for transmitting the fast feedback information of the P-FA1 400 is transmitted through the feedback polling MAP information 439 of the P-FA1 400 as shown by the arrow 2, and the data channel information 451 for transmitting the fast feedback information of the S-FA 410 is transmitted through the feedback polling MAP information 467 of the S-FA 410 as shown by the arrow 4.

The feedback channel information transmitted through the SFH 431 of the P-FA1 400 includes the information of Table 1.

The DL feedback channel information 481 of the P-FA2 420 is transmitted through the SFH 471 of the P-FA2 420 as shown by the arrow 5, and the DL feedback channel information 485 of the S-FA 410 is transmitted through the SFH 461 of the S-FA 410 as shown by the arrow 7. The data channel information 489 for transmitting the fast feedback information of the P-FA2 420 is transmitted through the feedback polling MAP information 479 of the P-FA2 420 as shown by the arrow 6, and the data channel information 491 for transmitting the fast feedback information of the S-FA 410 is transmitted through the feedback polling MAP information 467 of the S-FA 410 as shown by the arrow 8.

The feedback channel information transmitted using the SFH 471 of the P-FA2 420 includes the information of Table 1.

To carry information relating to the feedback channel 445 using the P-FA 1 400 and the feedback channel 485 using the P-FA2 420, the SFH 461 of the S-FA 410 includes information of Table 2.

TABLE 2

| Field | Notes |
| --- | --- |
| Number of feedback channel info | The number of feedback channel information for the secondary carrier |

TABLE 2-continued

| Field | Notes |
| --- | --- |
| For(i=0; i<Number of feedback channel info; i++){ | |
|     Carrier index | carrier index for primary carrier |
|     Number of UL ACK/NACK channels per HARQ feedback region | The Number of HARQ feedback channels |
|     Number of DLRUs for UL feedback channel per a UL AAI subframe | The number of UL feedback channels |
|     The start LRUs index for feedback channel | The start position of feedback channel |
| } | |

In Table 2, the SFH 461 of the asymmetric S-FA 410 includes a carrier index for the P-FA of the MSs which use the asymmetric S-FA 410, entire feedback channel region information (number of DLRUs for UL feedback channel per a UL AAI subframe) for the S-FA 410 of the MSs allocated in each P-FA, and HARQ feedback transmission channel region information (number of UL ACK/NACK channels for HARQ feedback region) of the feedback channel region. Herein, the entire feedback channel region includes information combining the HARQ feedback transmission channel region and the fast feedback channel region. Accordingly, the MS can obtain the fast feedback channel region information using the entire feedback channel region information and the HARQ feedback transmission channel region information.

The SFH 461 of the S-FA 410 in Table 2 can include feedback channel region start (the start LRUs index for feedback channel) information. The feedback channel region start information informs where the feedback channel region for the S-FA 410 starts from. However, when the feedback channel region follows the BR channel 443 and 483, the SFH 461 does not need to contain the feedback channel region start information.

The following explanations describe a method of the MS for processing the feedback of the asymmetric S-FA using the frame of FIG. 3 or FIG. 4.

Figure 5:
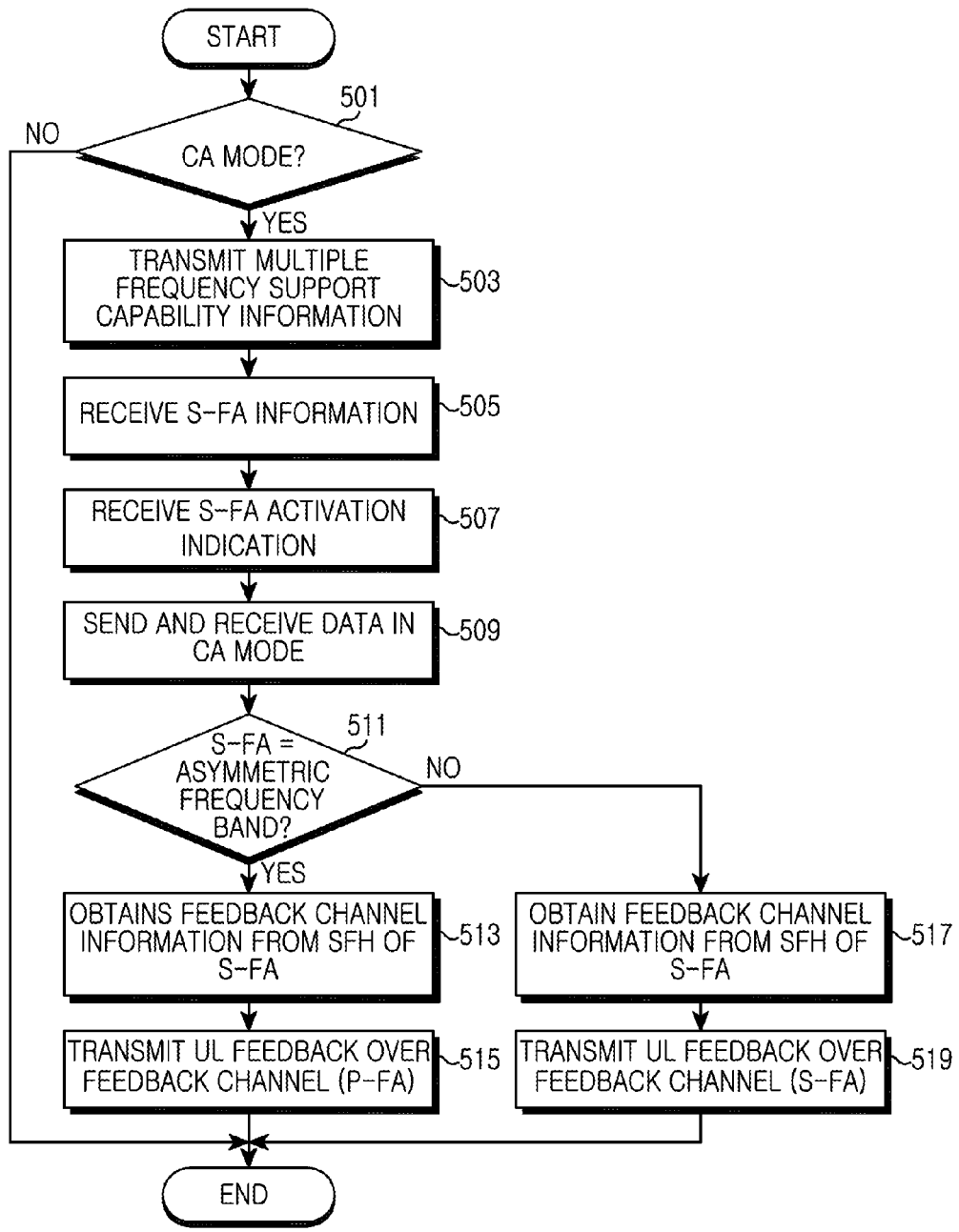
FIG. 5 illustrates a method for processing feedback of an asymmetric frequency band at a mobile station in a wireless communication system according to an exemplary embodiment of the present invention.

FIG. 5 illustrates a method for processing feedback of an asymmetric frequency band at an MS in a wireless communication system according to an exemplary embodiment of the present invention.

The MS, which is communicating with the BS using the P-FA, determines whether to enter the CA mode of the overlay mode in step 501.

If the MF determines not to enter the CA mode at step 501, the MS finishes this process.

If the MS determines to enter the CA mode at step 501, the MS transmits its multiple frequency support capability (multicarrier capability) information to the BS in step 503. Herein, the multiple frequency support capability information may include frequency bands supportable by the MS, the number of the frequency bands operable by the MS concurrently, and guard subcarrier support.

In step 505, the MS receives information of the S-FA to use in the CA mode, from the BS.

In step 507, the MS receives activation indication information for the S-FA from the BS. For example, the MS receives from the BS, the activation indication information for the UL/DL of the S-FA or the activation indication information for the DL.

In step 509, the MS transmits and receives data to and from the BS in the CA mode using the S-FA activated as instructed by the BS and the P-FA.

When transmitting and receiving data in the CA mode, the MS determines whether the S-FA is the asymmetric frequency band in step 511. For example, the MS determines whether the S-FA is the asymmetric frequency band using characteristic information of the frequency band contained in at least one of a global carrier configuration (AAI_Global-Config) message, a multiple frequency band information (AAI_MC-ADV) message, and a neighbor BS information (AAI_NBR-ADV) message which are received from the BS. Based on symmetric frequency band (fully configured carrier)/asymmetric frequency band (partially configured carrier) information of the frequency band characteristics, the MS determines whether the S-FA is the asymmetric frequency band. Alternatively, the MS may determine whether the S-FA is the asymmetric frequency band, using the activation indication information for the S-FA received from the BS in step 507. That is, when the BS instructs to activate only the DL of the S-FA, the MS recognizes that the S-FA is the asymmetric frequency band.

When the MS determines that the S-FA is the asymmetric frequency band at step 511, the MS obtains the feedback channel information for the asymmetric S-FA, from the SFH of the S-FA in step 513. For example, referring back to FIG. 3, the MS obtains the feedback channel information 335 for the DL of the S-FA 310, from the SFH 351 of the S-FA 310. The MS obtains the information of the data channel information 341 for transmitting the fast feedback information of the S-FA 310 from the feedback polling MAP information 357 of the S-FA 310. Using the P-FA 1 400 of FIG. 4, the MS may obtain the feedback channel information 445 for the DL of the S-FA 410 from the SFH 461 of the S-FA 410. The MS may obtain the information of the data channel 451 for transmitting the fast feedback information of the S-FA 410 from the feedback polling MAP information 467 of the S-FA 410.

In step 515, the MS confirms the feedback channel region of the S-FA allocated to the UL region of the P-FA, using the feedback channel information of the S-FA. Next, the MS transmits the feedback of the S-FA over the confirmed feedback channel region of the S-FA. For example, in FIG. 3, the MS transmits the feedback of the P-FA over the feedback channel 331 of the P-FA 300 and transmits the feedback of the S-FA over the feedback channel 335 of the S-FA 310.

When the MS determines that the S-FA is not the asymmetric frequency band at step 511, the MS obtains the feedback channel information of the symmetric S-FA, from the SFH of the S-FA in step 517.

In step 519, the MS confirms the feedback channel region of the S-FA allocated in the UL region of the S-FA. Next, the MS transmits the feedback of the S-FA over the confirmed feedback channel region of the S-FA.

Next, the MS finishes this process.

Figure 6:
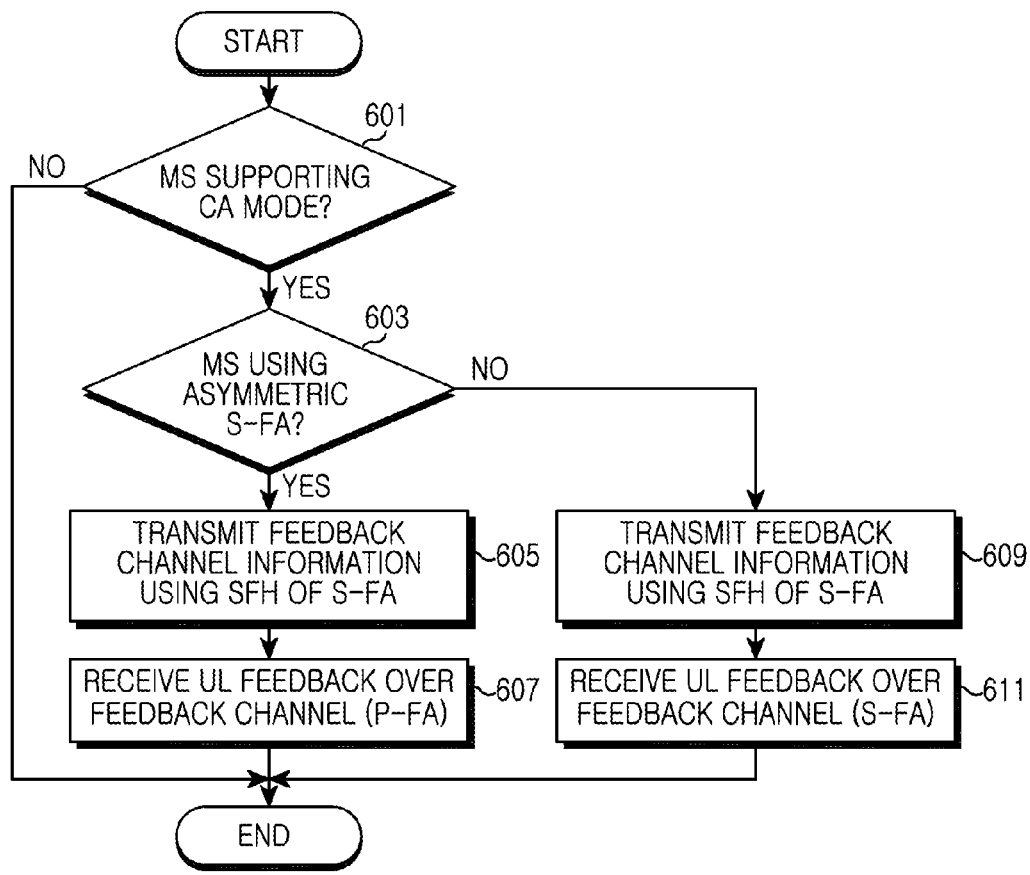
FIG. 6 illustrates a method for processing feedback of an asymmetric frequency band at a base station in a wireless communication system according to an exemplary embodiment of the present invention.

FIG. 6 illustrates a method for processing feedback of an asymmetric frequency band at a BS in a wireless communication system according to an exemplary embodiment of the present invention.

Referring to step 601, the BS determines whether the serviced MSs include the MS operating in the CA mode.

When the BS determines that there is no MS operating in the CA mode at step 601, the BS finishes this process.

When the BS determines that there is an MS operating in the CA mode at step 601, the BS determines whether there is an MS using the asymmetric S-FA in step 603.

When the BS determines that there is an MS using the asymmetric S-FA, the BS transmits the feedback channel allocation information of the P-FA and the feedback channel allocation information for the asymmetric S-FA using the SFH of the P-FA and the SFH of the S-FA in step 605. For example, in FIG. 3, the BS transmits the feedback channel information 331 for the DL of the P-FA 300 using the SFH 321 of the P-FA 300. The BS also transmits the feedback channel information 335 for the DL of the S-FA 310 using the SFH 351 of the S-FA 310. The BS may transmit the information of the data channel 341 for transmitting the fast feedback information of the S-FA 310 using the feedback polling MAP information 357 of the S-FA. For instance, when the MS uses the P-FA1 400 in FIG. 4, the BS transmits the feedback channel information 441 for the DL of the P-FA1 400 using the SFH 431 of the P-FA1 400. The BS transmits the feedback channel 445 information for the DL of the S-FA 410 using the SFH 461 of the S-FA 410. In so doing, the BS may transmit the information of the data channel 451 for transmitting the fast feedback information of the S-FA 410 using the feedback polling MAP information 467 of the S-FA 410.

In step 607, the BS receives the feedback for the P-FA and the asymmetric S-FA over the feedback channel allocated in the UL region of the P-FA according to the feedback channel allocation information sent over the SFHs of the P-FA and the S-FA.

Meanwhile, when the BS determines that there is no MS using the asymmetric S-FA at step 603, the BS transmits the feedback channel allocation information of the symmetric S-FA using the SFH of the S-FA in step 609. The BS transmits the feedback channel allocation information of the P-FA using the SFH of the symmetric P-FA.

In step 611, the BS receives the feedback of the P-FA over the feedback channel allocated in the P-FA according to the feedback channel allocation information sent over the SFH of the P-FA. The BS also receives the feedback of the S-FA over the feedback channel allocated in the S-FA according to the feedback channel allocation information sent over the SFH of the symmetric S-FA.

Next, the BS finishes this process.

In this exemplary embodiment, the BS transmits the feedback information of the asymmetric frequency band to the MS using the SFH.

Alternatively, the BS may transmit the feedback information of the asymmetric frequency band to the MS using a system channel information (AAI_SCD) message. A frame for the MS to transmit the feedback for the asymmetric S-FA can be constituted as shown in FIG. 7.

Figure 7:
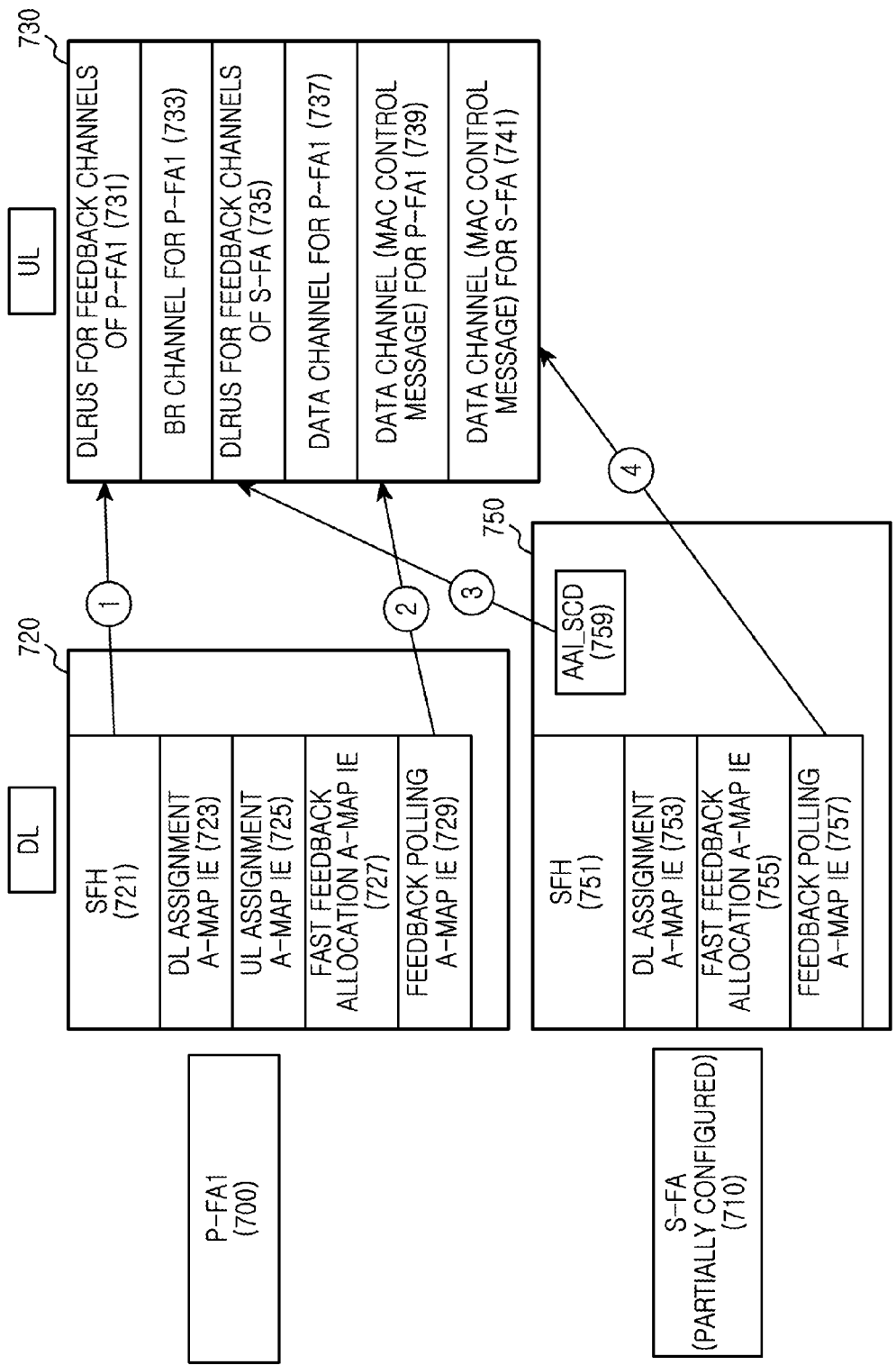
FIG. 7 illustrates a frame for transmitting feedback of an asymmetric frequency band in a wireless communication system according to an exemplary embodiment of the present invention.

FIG. 7 illustrates a frame for transmitting feedback of an asymmetric frequency band in a wireless communication system according to an exemplary embodiment of the present invention.

Referring to FIG. 7, the P-FA1 700 includes a DL region 720 and a UL region 730 and the S-FA 710 includes a DL region 750. That is, the P-FA1 700 is configured in the TDD manner.

The DL region 720 of the P-FA1 700 may include an SFH 721, DL resource allocation MAP information 723, UL resource allocation MAP information 725, fast feedback allocation MAP information 727, and feedback polling MAP information 729. Herein, the fast feedback allocation MAP information 727 and feedback polling MAP information 729, which are described to ease the understanding of exemplary embodiments of the present invention, may not be contained in the DL region 720 of the P-FA1 700.

The DL region 750 of the S-FA 710 may include an SFH 751, DL resource allocation MAP information 753, fast feedback allocation MAP information 755, feedback polling MAP information 757, and system channel information (AAI_SCD) 759. Herein, the fast feedback allocation MAP information 755 and the feedback polling MAP information 757, which are described to ease the understanding of an exemplary embodiment of the present invention, may not be contained in the DL region 750 of the S-FA 710.

The UL region 730 of the P-FA1 700 may include a feedback channel 731 for the DL of the P-FA1 700, a BR channel 733 of the P-FA1 700, a feedback channel 735 for the DL of the S-FA 710, a data channel 737 of the P-FA1 700, a data channel 739 for transmitting fast feedback information of the P-FA1 700, and a data channel 741 for transmitting fast feedback information of the S-FA 110.

In this frame, the DL feedback channel information 731 of the P-FA1 700 is transmitted through the SFH 721 of the P-FA1 700 as shown by the arrow 1, and the DL feedback channel information 735 of the S-FA 710 is transmitted through the system channel information 759 of the S-FA 710 as shown by the arrow 3. The data channel information 739 for transmitting the fast feedback information of the P-FA1 700 is transmitted through the feedback polling MAP information 729 of the P-FA 1 700 as shown by the arrow 2, and the data channel information 741 for transmitting the fast feedback information of the S-FA 710 is transmitted through the feedback polling MAP information 757 of the S-FA 710 as shown by the arrow 4. For example, the system channel information 759 includes the information of Table 1 or Table 2.

Now, a method of the MS for processing the feedback of the asymmetric S-FA using the frame of FIG. 7 is elucidated.

Figure 8:
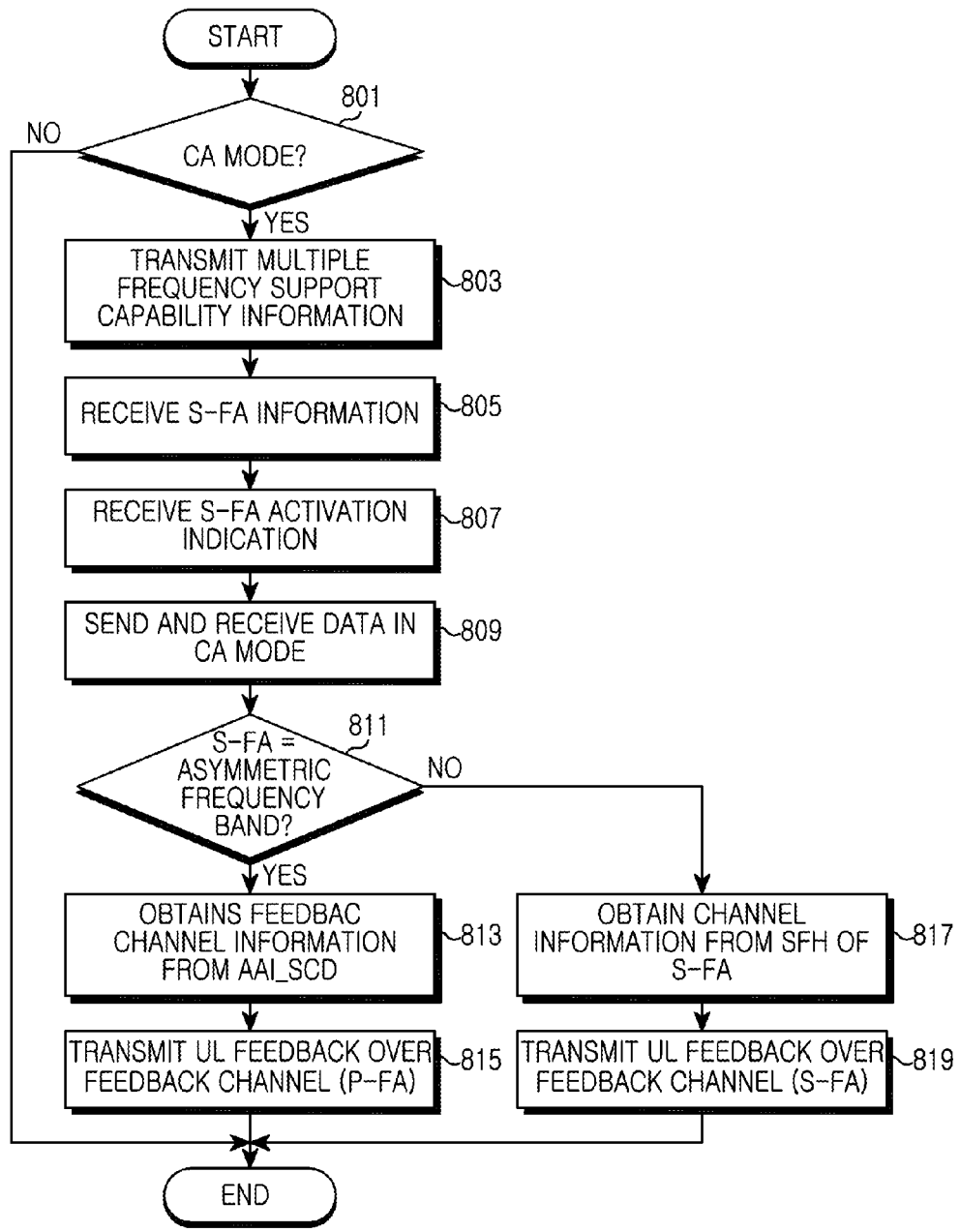
FIG. 8 illustrates a method for processing feedback of an asymmetric frequency band at a mobile station in a wireless communication system according to an exemplary embodiment of the present invention.

FIG. 8 illustrates a method of an MS for processing feedback of an asymmetric frequency band in a wireless communication system according to an exemplary embodiment of the present invention.

The MS which is communicating with the BS over the P-FA determines whether to enter the CA mode of the overlay mode in step 801.

If the MS determines not to enter the CA mode at step 801, the MS finishes this process.

However, if the MS determines to enter the CA mode at step 801, the MS transmits its multiple frequency support capability information to the BS in step 803. Herein, the multiple frequency support capability information includes frequency bands supportable by the MS, the number of the frequency bands operable by the MS concurrently, and guard subcarrier support.

In step 805, the MS receives information of the S-FA to use in the CA mode, from the BS.

In step 807, the MS receives activation indication information for the S-FA from the BS. For example, the MS receives from the BS, the activation indication information for the UL/DL of the S-FA or the activation indication information for the DL.

In step 809, the MS transmits and receives data to and from the BS in the CA mode using the S-FA activated as instructed by the BS and the P-FA.

When transmitting and receiving data in the CA mode, the MS determines whether the S-FA is the asymmetric frequency band in step 811. For example, the MS determines whether the S-FA is the asymmetric frequency band using characteristic information of the frequency band contained in at least one of the global carrier configuration (AAI_Global-Config) message, the multiple frequency band information (AAI_MC-ADV) message, and the neighbor BS information (AAI_NBR-ADV) message which are received from the BS. Based on the symmetric frequency band (fully configured carrier)/asymmetric frequency band (partially configured carrier) information of the frequency band characteristics, the MS determines whether the S-FA is the asymmetric frequency band. Alternatively, the MS may determine whether the S-FA is the asymmetric frequency band, using the activation indication information for the S-FA received from the BS in step 807. That is, when the BS instructs to activate only the DL of the S-FA, the MS recognizes that the S-FA is the asymmetric frequency band.

When the MS determines that the S-FA is the asymmetric frequency band at step 811, the MS obtains the feedback channel information for the asymmetric S-FA, from the system channel information (AAI_SCD) of the S-FA in step 813. For example, referring back to FIG. 7, the MS obtains the feedback channel information 735 for the DL of the S-FA 710, from the system channel information 759 of the S-FA 710. The MS may obtain the information of the data channel 741 for transmitting the fast feedback information of the S-FA 710, from the feedback polling MAP information 757 of the S-FA 710.

In step 815, the MS confirms the feedback channel region of the S-FA allocated to the UL region of the P-FA, using the feedback channel information of the S-FA. Next, the MS transmits the feedback of the S-FA over the confirmed feedback channel region of the S-FA. For example, in FIG. 7, the MS transmits the feedback of the P-FA over the feedback channel 731 of the P-FA 700 and transmits the feedback of the S-FA over the feedback channel 735 of the S-FA 700.

Meanwhile, when the MS determines that the S-FA is not the asymmetric frequency band at step 811, the MS obtains the feedback channel information of the S-FA, from the SFH of the S-FA in step 817.

In step 819, the MS confirms the feedback channel region of the S-FA allocated in the UL region of the S-FA. Next, the MS transmits the feedback of the S-FA over the confirmed feedback channel region of the S-FA.

Next, the MS finishes this process.

Figure 9:
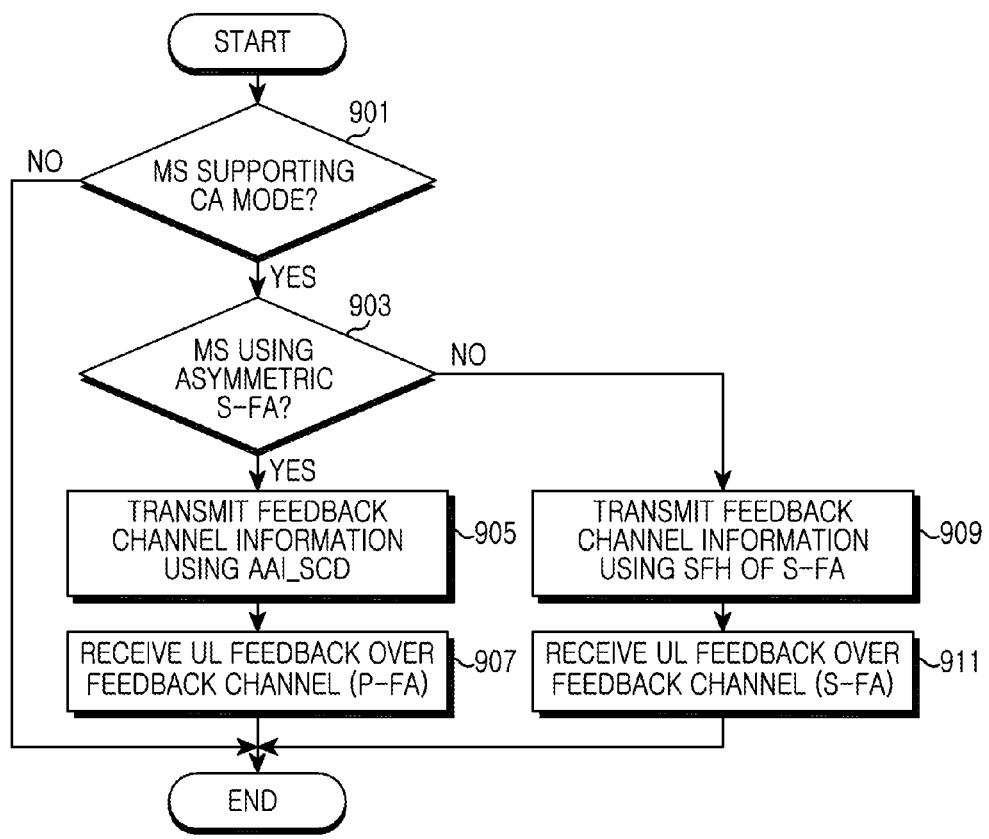
FIG. 9 illustrates a method for processing feedback of an asymmetric frequency band at a base station in a wireless communication system according to an exemplary embodiment of the present invention.

FIG. 9 illustrates a method of a BS for processing feedback of an asymmetric frequency band in a wireless communication system according to an exemplary embodiment of the present invention.

In step 901, the BS determines whether the serviced MSs include an MS operating in the CA mode.

When the BS determines that there is no MS operating in the CA mode at step 901, the BS finishes this process.

When the BS determines that there is an MS operating in the CA mode at step 901, the BS determines whether there is an MS using the asymmetric S-FA in step 903.

When the BS determines that there is an MS using the asymmetric S-FA at step 903, the BS transmits the feedback channel allocation information of the P-FA and the feedback channel allocation information for the S-FA using the SFH of the P-FA and the system channel information (AAI_SCD) of the S-FA in step 905. For example, in FIG. 7, the BS transmits the feedback channel information 735 for the DL of the S-FA 710 using the system channel information (AAI_SCD) 759 of the S-FA 700. The BS may transmit the information of the data channel 741 for transmitting the fast feedback information of the S-FA 710 using the feedback polling MAP information 757 of the S-FA 710.

In step 907, the BS receives the feedback for the P-FA and the asymmetric S-FA over the feedback channel allocated in the P-FA according to the feedback channel allocation information sent over the SFH of the P-FA and the system channel information of the S-FA.

Meanwhile, when the BS determines that there is no MS using the asymmetric S-FA at step 903, the BS transmits the feedback channel allocation information of the symmetric S-FA using the SFH of the S-FA in step 909. The BS transmits the feedback channel allocation information of the P-FA using the SFH of the symmetric P-FA.

In step 911, the BS receives the feedback of the P-FA over the feedback channel allocated in the P-FA according to the feedback channel allocation information sent over the SFH of the P-FA. The BS also receives the feedback of the S-FA over the feedback channel allocated in the S-FA according to the feedback channel allocation information sent over the SFH of the symmetric S-FA.

Next, the BS finishes this process.

Figure 10:
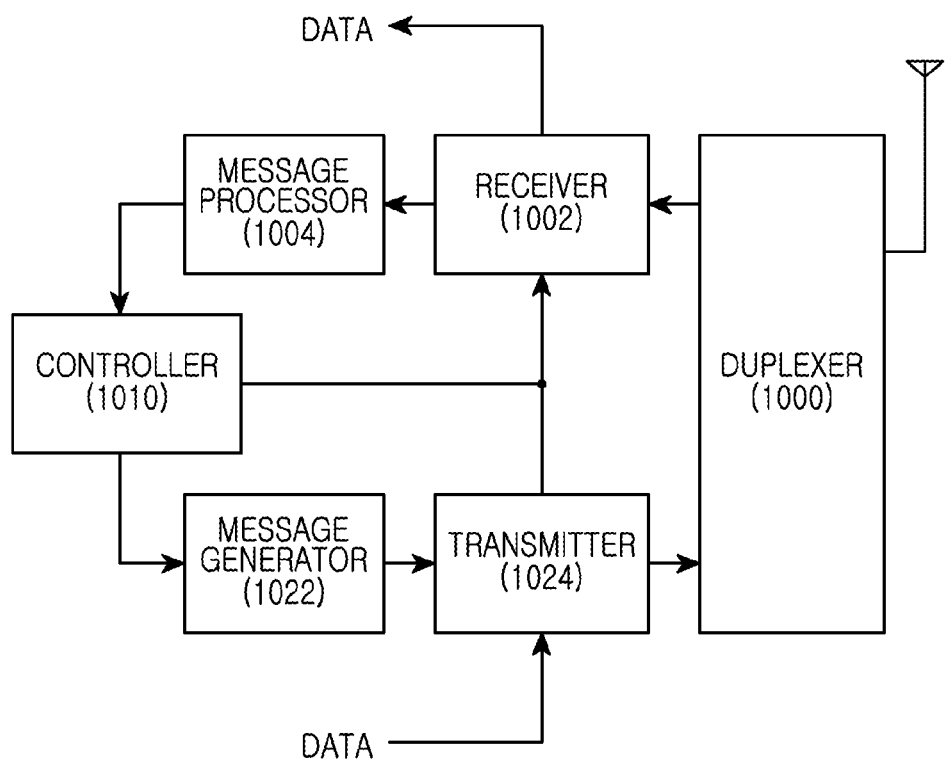
FIG. 10 illustrates a structure of a mobile station for supporting an asymmetric frequency band in a wireless communication system according to an exemplary embodiment of the present invention.

FIG. 10 is a block diagram of an MS for supporting an asymmetric frequency band in a wireless communication system according to an exemplary embodiment of the present invention.

The MS of FIG. 10 includes a duplexer 1000, a receiver 1002, a message processor 1004, a controller 1010, a message generator 1022, and a transmitter 1024.

The duplexer 1000 passes a transmit signal output from the transmitter 1024 to an antenna for transmission there from, and passes a receive signal from the antenna to the receiver 1002 according to the duplexing scheme.

The receiver 1002 demodulates a Radio Frequency (RF) signal fed from the duplexer 1000 into a baseband signal. The receiver 1002 may include an RF processing block, a demodulating block, a channel decoding block, and so on, which are not shown for convenience in description. Herein, the RF processing block converts the RF signal output from the duplexer 1000 into the baseband signal. The demodulating block may include a Fast Fourier Transform (FFT) operator for extracting data from subcarriers of the signal output from the RF processing block, which is not shown for convenience in description. The channel decoding block may include a demodulator, a deinterleaver, and a channel decoder, which are not shown for convenience in description.

Under the control of the controller 1010, the receiver 1002 changes a receive frequency band. For instance, when the MS does not support the overlay mode, the receiver 1002 changes the receive frequency band to cover the P-FA under the control of the controller 1010. For example, when the MS supports the overlay mode, the receiver 1002 changes the receive frequency band to cover the P-FA and at least one S-FA under the control of the controller 1010.

The message processor 1004 extracts control information from the signal output from the receiver 1002 and provides the extracted information to the controller 1010. That is, the message processor 1004 extracts the feedback channel information, the S-FA allocation information, and the S-FA indication information from the signal output from the receiver 1002, and provides the extracted information to the controller 1010. For example, when the asymmetric frequency band of FIG. 3 is used, the message processor 1004 obtains the feedback channel information 335 for the DL of the S-FA 310 from the SFH 351 of the S-FA 310. The message processor 1004 obtains the data channel information 341 for transmitting the fast feedback information of the S-FA 310 from the feedback polling MAP information 357 of the S-FA 310. In another example, when the asymmetric frequency band of FIG. 7 is used, the message processor 1004 obtains the feedback channel information 735 for the DL of the S-FA 710 from the system channel information 759 of the S-FA 710. The message processor 1004 obtains the data channel information 741 for transmitting the fast feedback information of the S-FA 710 from the feedback polling MAP information 757 of the S-FA 710. In the meantime, as for the symmetric frequency band, the message processor 1004 obtains the feedback channel information 735 for the DL of the S-FA 710 from the SFH 751 of the S-FA 710.

The controller 1010 controls the operations and the overlay mode of the MS. The controller 1010 controls to execute the overlay mode using the S-FA allocation information received from a serving BS, at least one S-FA activated by the S-FA indication information, and the P-FA.

According to whether the overlay mode is supported, the controller 1010 controls the frequency bands of the receiver 1002 and the transmitter 1024. For example, when the MS does not support the overlay mode, the controller 1010 controls to define the receive frequency band of the receiver 1002 and the transmit frequency band of the transmitter 1024 to cover the P-FA. When the MS uses the multiple bands of FIG. 3, the controller 1010 controls to define the receive frequency band of the receiver 1002 to cover the P-FA 300. The controller 1010 controls to define the transmit frequency band of the transmitter 1024 to cover the P-FA 300 and the S-FA 310.

The controller 1010 determines whether to use the asymmetric frequency band. For instance, the controller 1010 determines whether the S-FA is the asymmetric frequency band using the characteristic information of the frequency band contained in at least one of the global carrier configuration (AAI_Global-Config) message, the multiple frequency band information (AAI_MC-ADV) message, and the neighbor BS information (AAI_NBR-ADV) message which are received from the serving BS. Based on the symmetric frequency band (fully configured carrier)/asymmetric frequency band (partially configured carrier) information of the frequency band characteristics, the controller 1010 examines whether the S-FA is the asymmetric frequency band. Alternatively, the controller 1010 may determine whether the S-FA is the asymmetric frequency band, using the activation indication information for the S-FA received from the serving BS. That is, when the serving BS instructs to activate only the DL of the S-FA, the controller 1010 recognizes that the S-FA is the asymmetric frequency band.

When using the asymmetric frequency band, the controller 1010 controls the message processor 1004 to receive the feedback channel information for the asymmetric frequency band.

The message generator 1022 generates a control message to transmit to the serving BS under the control of the controller 1010. For example, under the control of the controller 1010, the message generator 1022 generates the control message including the multiple frequency support capability information of the MS. Herein, the multiple frequency support capability information includes the frequency bands supportable by the MS, the number of the frequency bands operable by the MS concurrently, and the guard subcarrier support. For example, the message generator 1022 generates a feedback message of the P-FA and at least one S-FA under the control of the controller 1010.

The transmitter 1024 encodes data to transmit to the serving BS and the control message output from the message generator 1022, converts them into an RF signal, and outputs the RF signal to the duplexer 1000. For example, when the asymmetric S-FA of FIG. 3 is used, the transmitter 1024 transmits the feedback information of the P-FA and the S-FA over the feedback channel 335 allocated in the UL of the P-FA 300 confirmed by the message processor 1004.

The transmitter 1024 may include a channel coding block, a modulating block, and an RF processing block, which are not shown for convenience in description. Herein, the channel coding block may include a modulator, an interleaver, a channel encoder, and so on, which are not shown for convenience in description. The modulating block may include an Inverse FFT (IFFT) operator for mapping the signal output from the channel coding block to subcarriers, which is not shown for convenience in description. The RF processing block converts the baseband signal output from the modulating block into an RF signal and outputs the RF signal to the duplexer 1000.

The transmitter 1024 alters the transmit frequency band under the control of the controller 1010.

Figure 11:
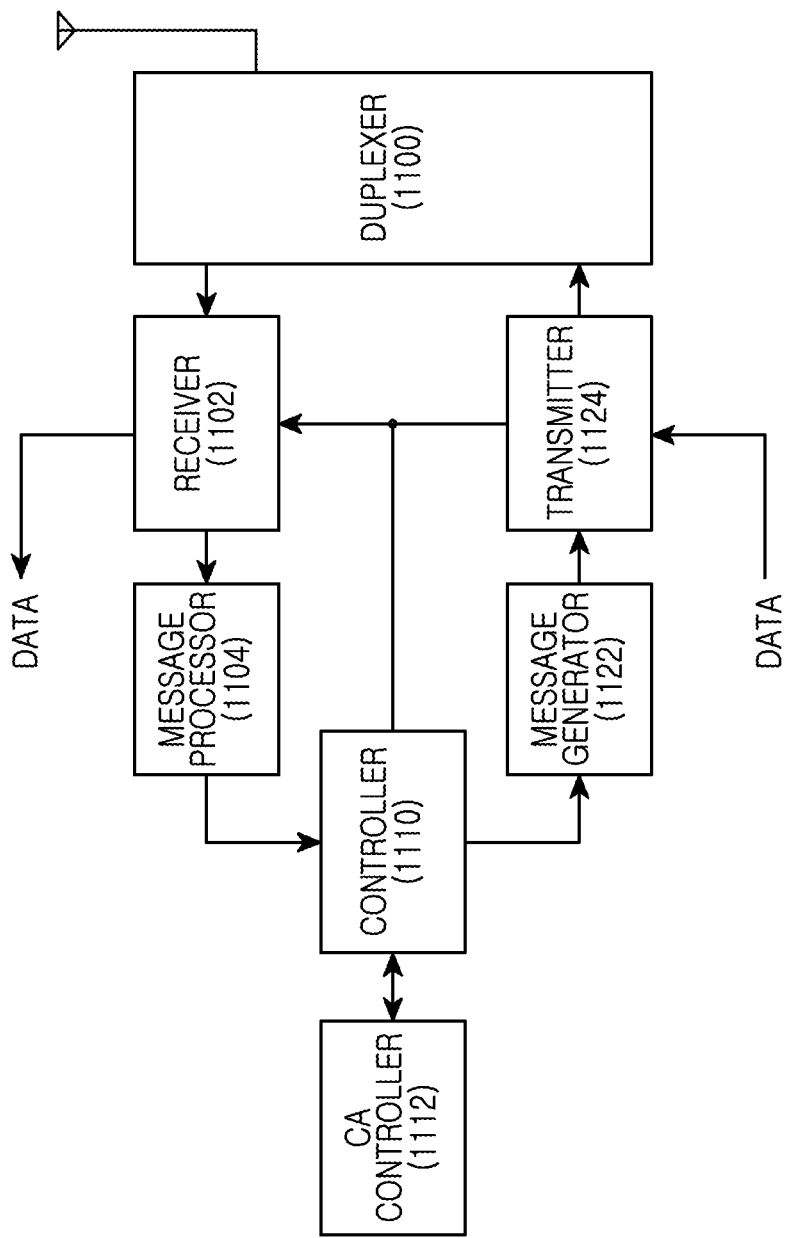
FIG. 11 illustrates a structure of a base station for supporting an asymmetric frequency band in a wireless communication system according to an exemplary embodiment of the present invention.

FIG. 11 is a block diagram of a BS for supporting an asymmetric frequency band in a wireless communication system according to an exemplary embodiment of the present invention.

The BS of FIG. 11 includes a duplexer 1100, a receiver 1102, a message processor 1104, a controller 1110, a CA controller 1112, a message generator 1122, and a transmitter 1124.

The duplexer 1100 passes a transmit signal output from the transmitter 1124 to an antenna for transmission there from, and passes a receive signal from the antenna to the receiver 1102 according to the duplexing scheme.

The receiver 1102 demodulates an RF signal fed from the duplexer 1100 into a baseband signal. The receiver 1102 may include an RF processing block, a demodulating block, a channel decoding block, and so on, which are not shown for convenience in description. Herein, the RF processing block converts the RF signal output from the duplexer 1000 into the baseband signal. The demodulating block may include an FFT operator for extracting data from subcarriers of the signal output from the RF processing block, which is not shown for convenience in description. The channel decoding block may include a demodulator, a deinterleaver, and a channel decoder, which are not shown for convenience in description.

Under the control of the controller 1110, the receiver 1102 changes a receive frequency band.

The message processor 1104 extracts control information from the signal output from the receiver 1102 and provides the extracted information to the controller 1110.

The controller 1110 controls the operations of the serving BS and the transmit and receive frequencies according to whether the overlay mode is supported. More specifically, based on whether the overlay mode is supported, the controller 1110 controls the frequency bands of the receiver 1102 and the transmitter 1124. For example, when the serviced MS does not support the overlay mode, the controller 1110 control to define the receive frequency band of the receiver 1102 and the transmit frequency band of the transmitter 1124 to cover the P-FA. For example, when the serviced MS uses the multiple bands of FIG. 3, the controller 1110 controls to define the receive frequency band of the receiver 1102 to cover the P-FA 300 and the S-FA 310. The controller 1110 also controls to define the transmit frequency band of the transmitter 1124 to cover the P-FA 300.

The CA controller 1112 determines the S-FA of the MS based on the multiple frequency support capability information of the MS which can support the multiple bands. The CA controller 1112 determines the region to activate in the S-FA allocated to the MS.

The message generator 1122 generates a control message to transmit to the MS under the control of the controller 1110. For example, under the control of the controller 1110, the message generator 1122 generates a control message including the S-FA information of the MS and a control message including the S-FA activation indication information. For example, the message generator 1122 generates a control message including the feedback channel information of the P-FA and the S-FA. When the asymmetric S-FA of FIG. 7 is used, the message generator 1122 generates a message of the system channel information 759 of the S-FA 710 to include the feedback channel information of the S-FA. When the asymmetric S-FA of FIG. 3 is used, the message generator 1122 generates the SFH 351 of the S-FA 310 to include the feedback channel information of the S-FA.

The transmitter 1124 encodes the data to transmit to the MS and the control message output from the message generator 1122, converts them into an RF signal, and outputs the RF signal to the duplexer 1100. The transmitter 1124 may include a channel coding block, a modulating block, and an RF processing block, which are not shown for convenience in description. Herein, the channel coding block includes a modulator, an interleaver, a channel encoder, and so on, which are not shown for convenience in description. The modulating block may include an IFFT operator for mapping the signal output from the channel coding block to subcarriers, which is not shown for convenience in description. The RF processing block may convert the baseband signal output from the modulating block into an RF signal and output the RF signal to the duplexer 1100.

Under the control of the controller 1110, the transmitter 1124 alters its transmit frequency band. For example, when the serviced MS does not support the overlay mode, the transmitter 1124 changes the transmit frequency band to cover the P-FA under the control of the controller 1110. When the serviced MS supports the overlay mode, the transmitter 1124 changes the transmit frequency band to cover the P-FA and at least one S-FA under the control of the controller 1110.

The MS of FIG. 10 and the BS of FIG. 11 include the single transmitter and the single receiver. However, the MS and the BS may include two or more transmitters and receivers for the P-FA and at least one S-FA.

In the exemplary embodiment of the present invention, the BS may transmit the feedback channel information for the asymmetric S-FA to the MS using any one of the SFH and the system channel information (AAI_SCD) message.

Alternatively, the BS may transmit the entire feedback channel region information (number of DLRUs for UL feedback channel per a UL AAI subframe) of the feedback channel information for the S-FA and the HARQ feedback transmission channel region information (number of UL ACK/NACK channels per HARQ feedback region) of the feedback channel region over the SFH, and transmit the feedback channel region start (the start LRUs index for feedback channel) through the system channel information (AAI_SCD) message.

In the exemplary embodiment of the present invention, the MS may fulfill the multiple frequency band operation using one P-FA and one S-FA. However, the present invention is not limited thereto and is applicable to a case where the MS conducts the multiple frequency band operation using at least one S-FA. When at least one S-FA includes the asymmetric carrier aggregation, the BS may transmit the feedback channel information for each asymmetric S-FA using at least one of the SFH of the asymmetric S-FA and the system channel information (AAI_SCD). Herein, the feedback channel for the asymmetric S-FA may be allocated to the P-FA of the MS.

In the exemplary embodiment of the present invention, the BS may transmit the feedback channel information for the asymmetric S-FA to the MS through a broadcast signal of the SFH and the system channel information (AAI_SCD).

Alternatively, the BS may transmit the feedback channel information for the S-FA to the MS through the activation indication information for the asymmetric S-FA. In this case, the feedback channel information may include the information described in Table 1 or Table 2.

As set forth above, when the asymmetric frequency carrier aggregation is allocated to the MS in the wireless communication system, the MS may transmit the channel feedback of the asymmetric S-FA using the P-FA. Therefore, the channel feedback of the asymmetric S-FA can be transmitted in the asymmetric frequency carrier aggregation.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An operating method for a Mobile Station (MS) operating in a Carrier Aggregation (CA) mode in a wireless communication system, the method comprising:
   receiving system configuration information transmitted on at least one downlink (DL) only secondary carrier partially configured as an asymmetric frequency band from a base station (BS); and
   transmitting feedback information related to the at least one secondary carrier through a feedback channel at a feedback region of a primary carrier configured as a symmetric frequency band to the BS, wherein the feedback region is indicated in the system configuration information.

2. The method of claim 1, further comprising:
   when executing the CA mode, transmitting multiple frequency support capability information to the BS over the primary carrier;
   receiving at least one information on the secondary carrier to use in the CA mode, from the BS;
   transmitting and receiving data to and from the BS using the primary carrier and a secondary carrier activated by the BS among the at least one secondary carrier; and
   when transmitting and receiving the data to and from the BS, determining whether there exists an asymmetric frequency band,
   wherein, when the asymmetric frequency band exists, the feedback region is obtained.

3. The method of claim 2, wherein the multiple frequency support capability information comprises information of at least one of frequency band supportable by the MS, the number of frequency bands operable by the MS concurrently, and whether a guard subcarrier is supported.

4. The method of claim 2, wherein the determining of whether there exists the asymmetric frequency band comprises:
   determining whether an asymmetric frequency band is present using characteristic information of the frequency band contained in at least one of a global carrier configuration message, a multiple frequency band information message, and a neighbor BS information message which are received from the BS.

5. The method of claim 2, wherein the determining of whether there exists the asymmetric frequency band comprises:
   determining whether an asymmetric frequency band is present using activation indication information for at least one secondary frequency band received from the BS.

6. The method of claim 1, wherein the feedback region is indicated using the system configuration information comprising at least one of:
   a physical carrier index for the primary carrier;
   a start Distributed Logical Resource Unit (DLRU) index for feedback channel;
   the number of DLRUs for feedback channel; and
   the number of Hybrid Automatic Repeat reQuest (HARQ) feedback channel per HARQ feedback region.

7. The method of claim 1, further comprising:
when there is no asymmetric frequency band in at least two frequency bands used by the MS, confirming information of a feedback channel for each frequency band based on a super frame header of each frequency band; and
transmitting feedback information for each frequency band over the confirmed feedback channel.

8. An apparatus for a Mobile Station (MS) operating in a Carrier Aggregation (CA) mode in a wireless communication system, the apparatus comprising:
a receiver configured to receive system configuration information transmitted on at least one downlink (DL) only secondary carrier partially configured as an asymmetric frequency band from a base station (BS); and
a transmitter configured to transmit feedback information related to the at least one secondary carrier through a feedback channel at a feedback region of a primary carrier configured as a symmetric frequency band to the BS, wherein the feedback region is indicated in the system configuration information.

9. The apparatus of claim 8, further comprising a controller configured to control the transmitter and the receiver to:
when executing the CA mode, transmit multiple frequency support capability information to the BS over the primary carrier, receive at least one information on the secondary carrier to use in the CA mode, from the BS, transmit and receive data to and from the BS using the primary carrier and a secondary carrier activated by the BS among the at least one secondary carrier,
wherein the controller is configured to determine whether there exists an asymmetric frequency band, and
wherein, when the asymmetric frequency band exists, the controller is configured to obtain the feedback region.

10. The apparatus of claim 9, wherein the multiple frequency support capability information comprises information of at least one of frequency band supportable by the MS, the number of frequency bands operable by the MS concurrently, and whether a guard subcarrier is supported.

11. The apparatus of claim 9, wherein the controller is configured to determine whether there is an asymmetric frequency band using characteristic information of the frequency band contained in at least one of a global carrier configuration message, a multiple frequency band information message, and a neighbor BS information message which are received from the BS.

12. The apparatus of claim 9, wherein the controller is configured to determine whether an asymmetric frequency band is present using activation indication information for at least one secondary frequency band received from the BS.

13. The apparatus of claim 8, wherein the feedback region is indicated using the system configuration information comprising at least one of:
a physical carrier index for the primary carrier;
a start Distributed Logical Resource Unit (DLRU) index for feedback channel;
a number of DLRUs for feedback channel; and
a number of Hybrid Automatic Repeat Request (HARQ) feedback channels per HARQ feedback region.

14. The apparatus of claim 8, wherein, when there is no asymmetric frequency band in at least two frequency bands used by the MS, a controller is configured to confirm information of a feedback channel for each frequency band based on a super frame header of each frequency band.

15. An operating method for a Base Station (BS) operating in a Carrier Aggregation (CA) mode in a wireless communication system, the method comprising:
transmitting system configuration information on at least one downlink (DL) only secondary carrier partially configured as an asymmetric frequency band to a Mobile Station (MS); and
receiving feedback information related to the at least one secondary carrier through a feedback channel at a feedback region of a primary carrier configured as a symmetric frequency band from the MS,
wherein the feedback region is determined indicated in the system configuration information.

16. The method of claim 15, further comprising:
when the CA mode is executed, transmitting to the MS at least one information on the secondary carrier to be used by the MS in the CA mode, determined by considering multiple frequency support capability information of the MS received over the primary carrier of the MS;
transmitting activation indication information for the at least one secondary carrier to the MS;
transmitting and receiving data to and from the MS using the secondary carrier instructed to activate and the P-FA; and
when transmitting and receiving data to and from the MS, determining whether there exists an asymmetric frequency band among the frequency bands used by the MS,
wherein, when the asymmetric frequency band is present among the frequency bands used by the MS, feedback channel information for the asymmetric frequency band is transmitted.

17. The method of claim 16, wherein the multiple frequency support capability information comprises information of at least one of frequency band supportable by the MS, the number of frequency bands operable by the MS concurrently, and whether a guard subcarrier is supported.

18. The method of claim 16, wherein the determining of whether there exists the asymmetric frequency band comprises:
determining whether an asymmetric frequency band is present using the activation indication message sent to the MS.

19. The method of claim 15, wherein the feedback region is indicated using the system configuration information comprising at least one of:
a physical carrier index for the primary carrier;
a start Distributed Logical Resource Unit (DLRU) index for feedback channel;
a number of DLRUs for feedback channel; and
a number of Hybrid Automatic Repeat Request (HARQ) feedback channels per HARQ feedback region.

20. The method of claim 15, further comprising:
when there is no asymmetric frequency band among at least two frequency bands used by the MS, transmitting information of a feedback channel for each frequency band using a super frame header of each frequency band; and
receiving feedback information for each frequency band over the confirmed feedback channel.

21. An apparatus for a Base Station (BS) operating in a Carrier Aggregation (CA) mode in a wireless communication system, the apparatus comprising:
a transmitter configured to transmit system configuration information on at least one downlink (DL) only secondary carrier partially configured as an asymmetric frequency band to a Mobile Station (MS); and
a receiver configured to receive feedback information related to the at least one secondary carrier through a feedback channel at a feedback region of a primary carrier configured as a symmetric frequency band from the MS, wherein the feedback region is determined indicated in the system configuration information.

22. The apparatus of claim 21, further comprising:

a controller configured, when the CA mode is executed, to determine at least one secondary carrier to be used by the MS in the CA mode and whether to activate each secondary carrier, based on multiple frequency support capability information of the MS received over the primary carrier of the MS, and to control to transmit and receive data to and from the MS using the at least one frequency band indicated to activate, wherein, when the frequency bands used by the MS comprise the asymmetric frequency band, the controller is configured to control to transmit feedback channel information for the asymmetric frequency band.

23. The apparatus of claim 22, wherein the multiple frequency support capability information comprises information of at least one of frequency band supportable by the MS, the number of frequency bands operable by the MS concurrently, and whether a guard subcarrier is supported.

24. The apparatus of claim 22, wherein the controller determines whether there is an asymmetric frequency band using activation indication information sent to the MS.

25. The apparatus of claim 21, wherein the feedback region is indicated using the system information comprising at least one of:

a physical carrier index for the primary carrier;

a start Distributed Logical Resource Unit (DLRU) index for feedback channel;

the number of DLRUs for feedback channel; and the number of Hybrid Automatic Repeat Request (HARQ) feedback channel per HARQ feedback region.

26. The apparatus of claim 21, wherein, when the at least two frequency bands used by the MS comprise no asymmetric frequency band, the transmitter is configured to transmit information of a feedback channel for each frequency band using a super frame header of each frequency band.

* * * * *